(12) United States Patent
Betz et al.

(10) Patent No.: US 8,087,430 B1
(45) Date of Patent: Jan. 3, 2012

(54) LEAK DETECTING HOSE

(76) Inventors: James C. Betz, South Bend, IN (US);
Geoffrey A. Barnes, Kennewick, WA (US)

( * ) Notice: Subject to any disclaimer, the term of this patent is extended or adjusted under 35 U.S.C. 154(b) by 73 days.

(21) Appl. No.: 12/393,731

(22) Filed: Feb. 26, 2009

(51) Int. Cl.
*F16L 55/00* (2006.01)

(52) U.S. Cl. ........ 138/104; 138/125; 138/130; 138/132; 138/133

(58) Field of Classification Search .......... 138/125, 138/132, 133, 104, 130
See application file for complete search history.

(56) References Cited

U.S. PATENT DOCUMENTS

| | | | |
|---|---|---|---|
| 4,029,889 A | | 6/1977 | Mizuochi |
| 4,131,757 A | * | 12/1978 | Felkel .............................. 174/107 |
| 4,554,650 A | * | 11/1985 | Brown et al. ................... 367/154 |
| 5,325,706 A | | 7/1994 | Grose |
| 5,546,435 A | | 8/1996 | Collin et al. |
| 5,546,992 A | * | 8/1996 | Chick et al. ...................... 138/98 |
| 5,551,484 A | * | 9/1996 | Charboneau ................... 138/104 |
| 5,622,210 A | | 4/1997 | Crisman et al. |
| 5,634,497 A | | 6/1997 | Neto |
| 5,714,681 A | | 2/1998 | Furness |
| 6,026,862 A | * | 2/2000 | Friedrich et al. ............... 138/112 |
| 6,122,955 A | | 9/2000 | Hoog et al. |
| 6,305,427 B1 | * | 10/2001 | Priest, II ........................ 138/125 |
| 6,498,991 B1 | * | 12/2002 | Phelan et al. .................... 702/34 |
| 6,550,499 B1 | | 4/2003 | Pai |
| 6,857,452 B2 | * | 2/2005 | Quigley et al. ................. 138/125 |
| 7,166,177 B2 | * | 1/2007 | Friedrich et al. ............... 156/184 |
| 7,308,911 B2 | * | 12/2007 | Wilkinson ....................... 138/104 |
| 7,555,936 B2 | * | 7/2009 | Deckard .......................... 73/49.5 |

FOREIGN PATENT DOCUMENTS

| | | |
|---|---|---|
| JP | 61-262300 A | 11/1986 |
| JP | 2006220537 | 8/2006 |
| KR | 10-2003-0070416 A | 8/2003 |
| WO | WO 00-61472 A1 | 10/2000 |
| WO | WO 2006-086178 A1 | 8/2006 |

* cited by examiner

*Primary Examiner* — James Hook
(74) *Attorney, Agent, or Firm* — Botkin & Hall, LLP

(57) ABSTRACT

A leak detecting hose for transporting fluid. The hose has an inner and outer layer. The outer layer circumscribes the inner layer. A transition layer is located between the inner and outer layer, and the transition layer provides a flow path for the fluid in the hose when the inner layer is breached. A first conductive wire is placed in contact with the transition layer, and a second conductive wire is placed in contact with the transition layer. The conductive wires are adjacent to and spaced from each other. When the inner layer of the hose is breached, the first and second wires will contact the fluid in the flow path. The conductive wires are radially equidistant from the center of the hose and helically wound around the inner layer. The transition layer may include reinforcement material, which can have filaments that provide a flow path for the fluid.

5 Claims, 8 Drawing Sheets

LEAK DETECTING HOSE

BACKGROUND OF THE INVENTION

In many industrial processes, fluids are transported through hoses. Depending on the application, leakage of any amount of the fluid may be critical. In the transportation of hazardous fluids, an unchecked leak can be extremely costly. A hose that provides notification that it is leaking is desirable in such applications.

Attempts at creating a leak detecting hose were addressed in U.S. Pat. No. 5,634,497. In this hose, an inner liner has a first layer of braided copper wire placed over it. A layer of electrically insulating material encompasses the first layer of copper wire. A second layer of braided copper wire is placed over the insulating material. A finishing layer encompasses the hose assembly described. The braided layers of copper wire are electrically connected through the use of a bipolar socket. When the inner wires wear out due to abrasion, the first and second layers of wires will no longer be connected, and a sensor will detect the open circuit due to wear. The invention of this patent attempts to prevent leaks by detecting wear before the hose is weakened to a point where it cannot contain the pressure within itself. Currently, a small pinhole leak would remain undetected as long as enough of the copper wires remained in contact to complete an electric circuit.

SUMMARY OF THE INVENTION

The present invention relates to a leak detecting hose for transporting fluid. The hose has an inner layer and an outer layer. The outer layer circumscribes the inner layer. A transition layer is located between the inner and outer layer, and the transition layer provides a flow path for the fluid in the hose when the inner layer is breached. A first conductive wire is placed in contact with the transition layer, and a second conductive wire is placed in contact with the transition layer. The conductive wires are adjacent to and spaced from each other. When the inner layer of the hose is breached, the first and second wires will contact the fluid in the flow path.

The conductive wires are radially equidistant from the center of the hose and helically wound around the inner layer. The transition layer may include reinforcement material. The reinforcement material can have filaments that provide a flow path for the fluid. The filaments are in contact with the conductive wires.

In another aspect of the invention, the transition layer is an interface between an outer surface of the inner layer and an inner surface of the outer layer. In this configuration, when the inner layer is breached, the flow path of the fluid will contact both wires.

DETAILED DESCRIPTION OF INVENTION

Figure 1:
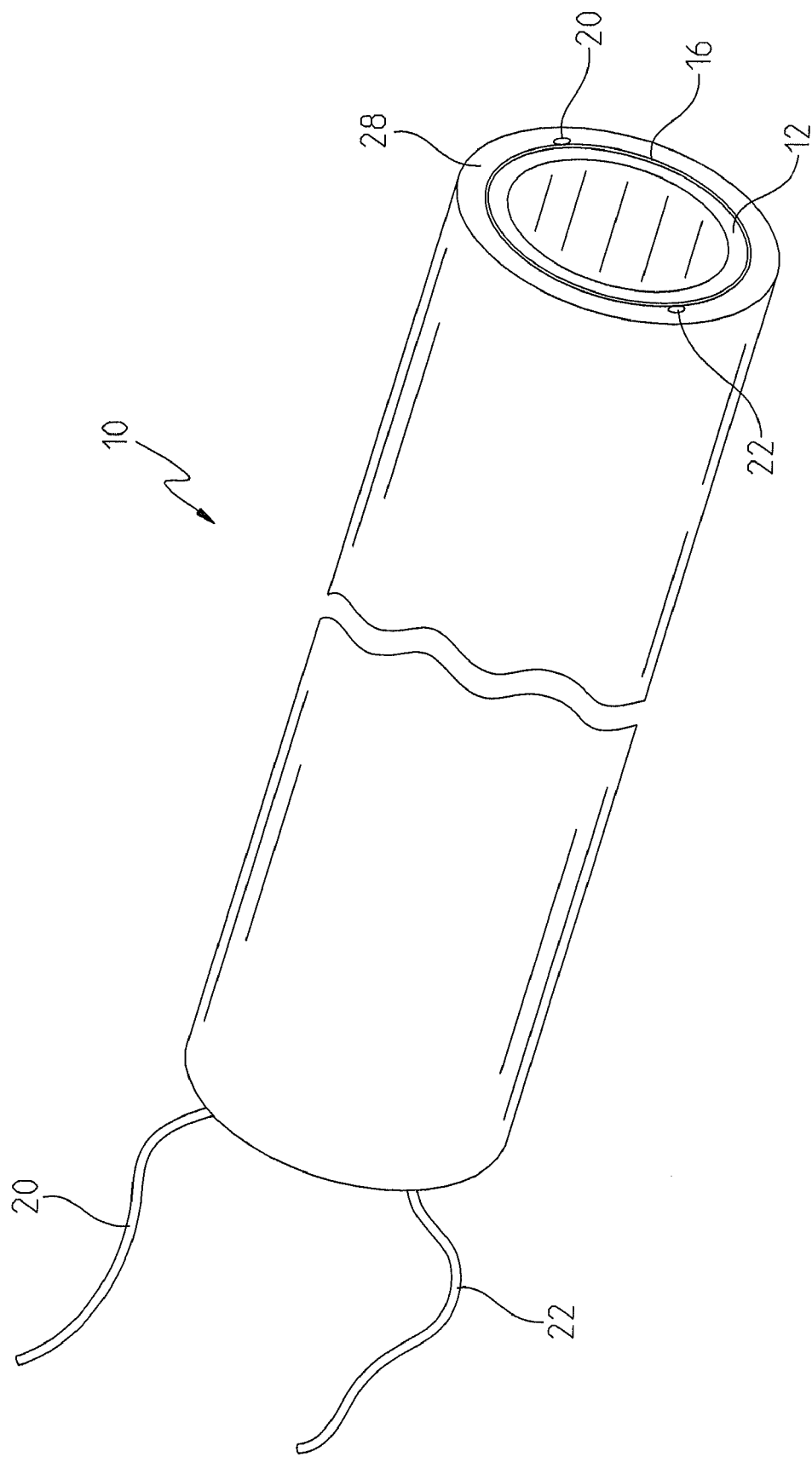
FIG. 1 is a perspective view of the hose.
Figure 2:
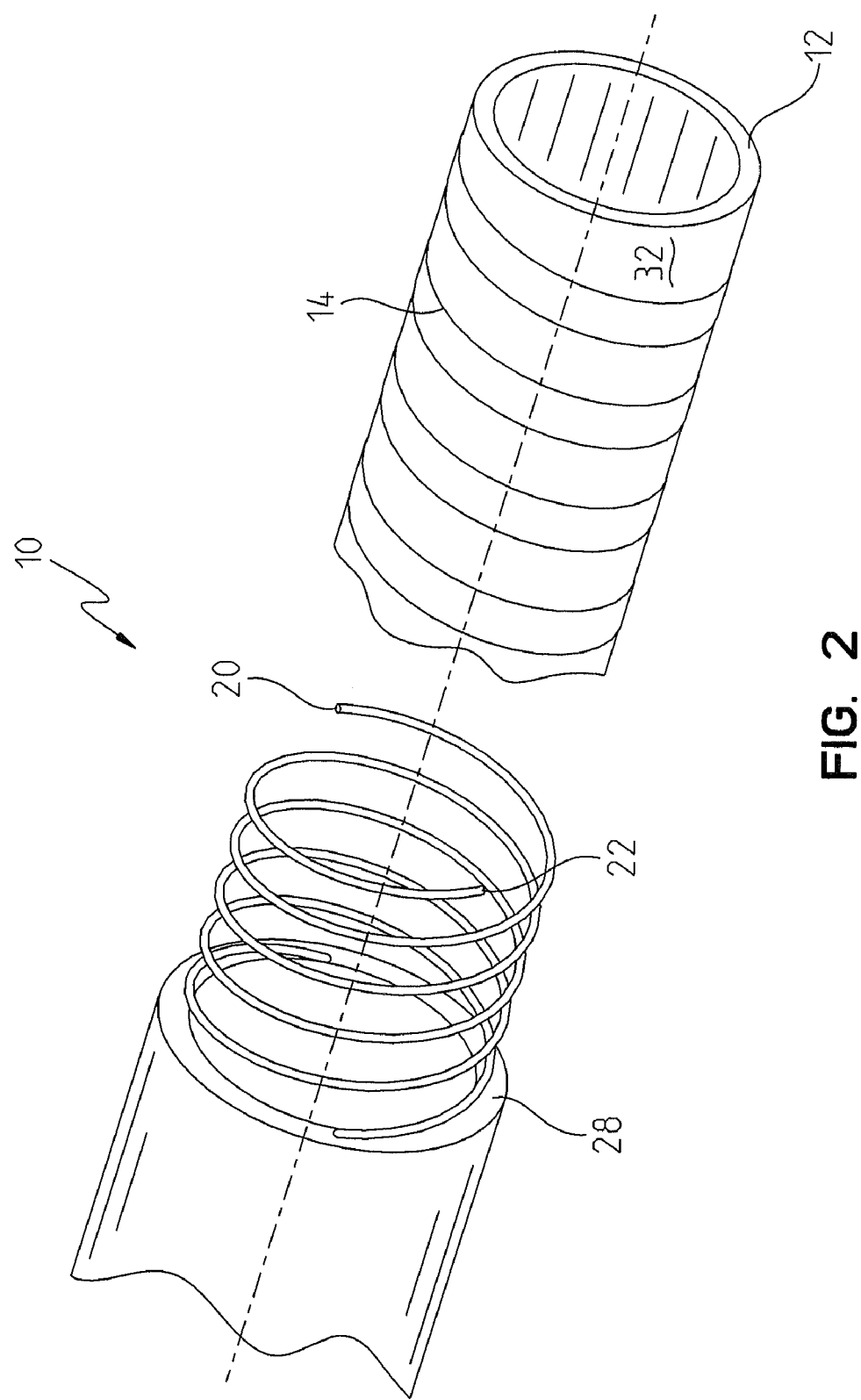
FIG. 2 is an exploded view of the hose shown in FIG. 1.
Figure 3:
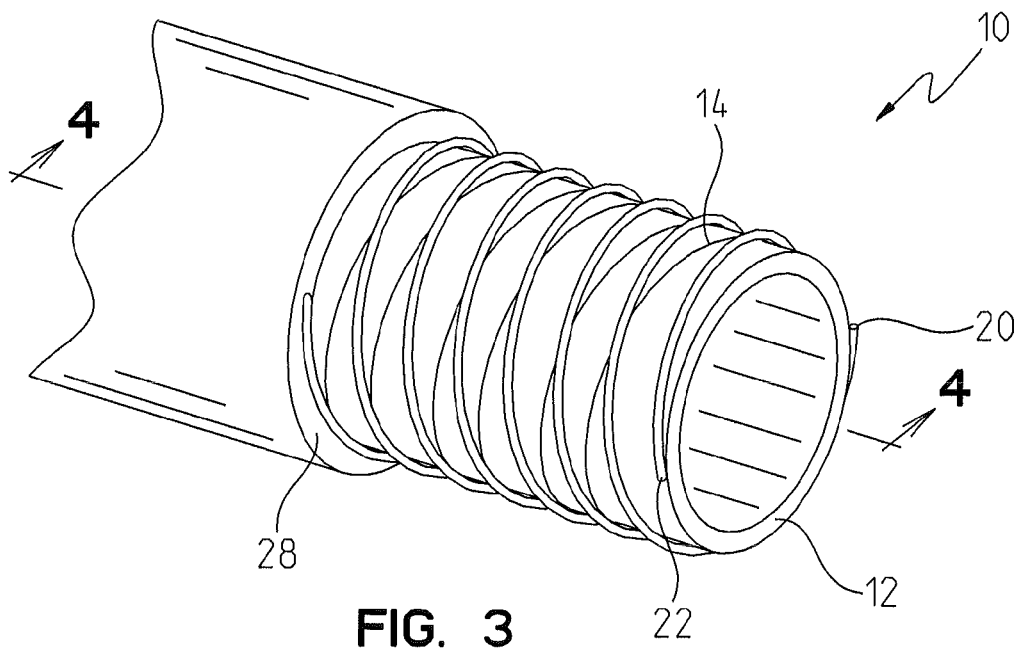
FIG. 3 is a cutaway perspective of the hose shown in FIG. 1.

An embodiment of the hose 10 of this invention is shown in FIG. 1. FIG. 3, shows a cut away of the end of the hose, with some of the material removed for illustrative purposes. The hose has an inner layer 12 which is typically a rubber material, but may be any elastomeric material. This inner layer 12 may be formed by depositing material on a mandrel. After the inner layer 12 is in place, a layer of filaments or fabric indicated at 14 is wound around the top of the inner layer 12. The filaments 14 form a transition layer 16 that will be discussed later. The filaments 14 are wound in a helical pattern and may be spaced as shown in FIG. 3. This helical pattern resembles a left hand threaded fastener which will hereinafter be referred to as a left hand helix. The pattern illustrated in FIG. 3 may be the result of rotating the inner layer 12 on a mandrel clockwise as viewed from the right end and beginning to wind a filament 14 from the right end toward the left end. The spacing may be much closer than that illustrated in FIG. 3, and the filaments 14 may touch each other. The filaments 14 act as reinforcement material to strengthen the hose 10 as is common in the art of hose construction.

A first conductive wire 20 is wound around the filaments 14 as shown in FIG. 3. The first wire 20 begins at the three o'clock position as viewed from the right end shown in FIG. 3 and is helically wound over the filaments 14. The first wire 20 is in contact with the filaments 14. A second conductive wire 22 beginning at the nine o'clock position is helically wound around the filaments 14 adjacent to and spaced from the first wire 20. Both of the wires 20, 22 are wound in the same helical pattern. The pattern in which the wires 20, 22 are wound resembles a right hand threaded fastener and will hereinafter be referred to as a right hand helix. The wires 20, 22 themselves have no insulation and are made of any material that conducts electricity well.

Figure 4:
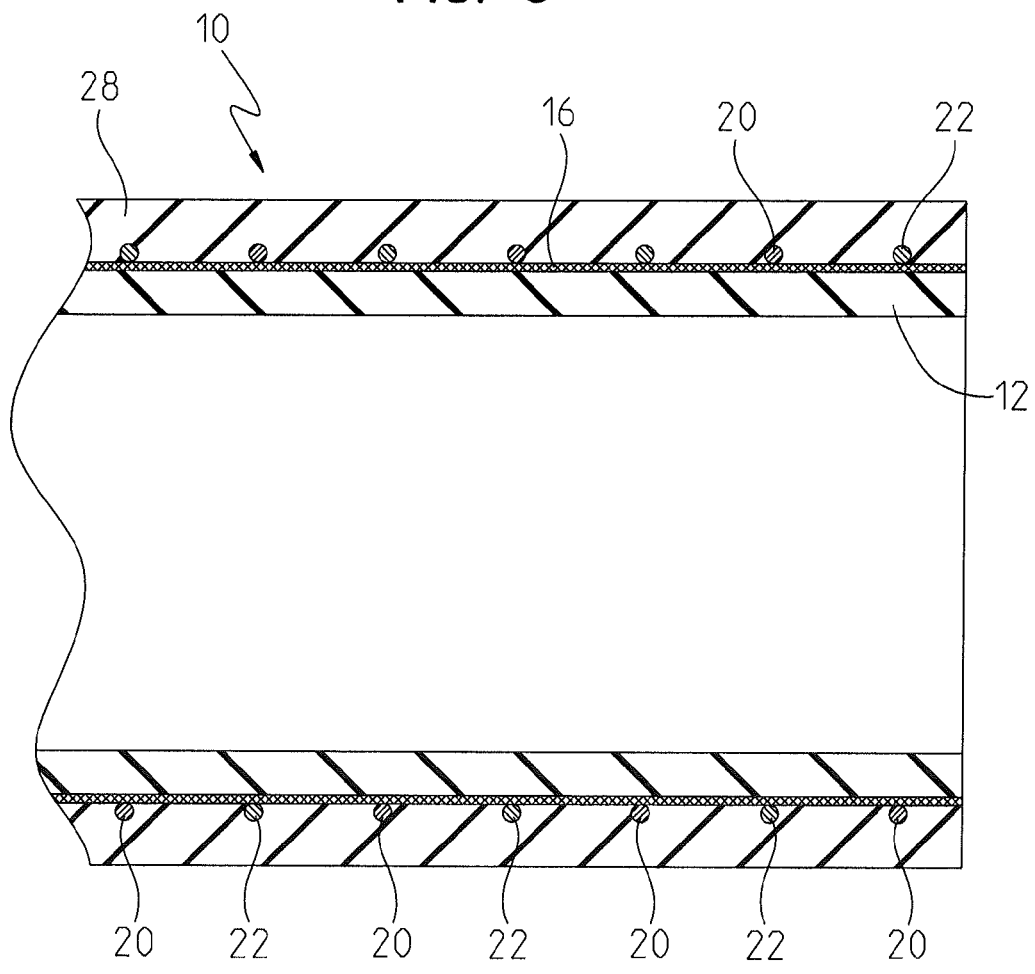
FIG. 4 is a sectional view of the hose shown in FIG. 3 taken about the line 4-4.

An outer layer 28 is put over the inner layer 12 once the filaments 14 and wires 20, 22 are in place. The outer layer 28 may be the same material as the inner layer, or could possibly be a different material. The outer layer 28 is deposited on the wires 20, 22, filaments 14, and inner layer 12 so that all of the aforementioned components are sealed within the outer layer 28. As the outer layer 28 is deposited, it flows into any spaces between the wires 20, 22, or space between the filaments 14. FIG. 4 shows a sectional view of the hose that is not to scale, which shows the hose 10 after the outer layer 28 of material is deposited. The transition layer 16 is best seen in FIG. 4. As mentioned above, the filaments 14 may be wound in a left hand helical pattern with some spacing between the filaments or the filaments 14 may be wound so that they are tightly packed without any spacing between filaments as they are wound. Generally, it is preferable to wind the helix of the filaments 14 in the opposite hand as that of the wires 20, 22. This will result in contact between the filaments 14 as the filaments 14 and wires 20, 22 cross. FIG. 3 shows intermittent contact between the filaments 14 and wires 20, 22. Multiple layers of filaments 14 may also be used to make a thicker transition layer 16 and ensure contact between the filaments 14 and the wires 20, 22.

Figure 5:
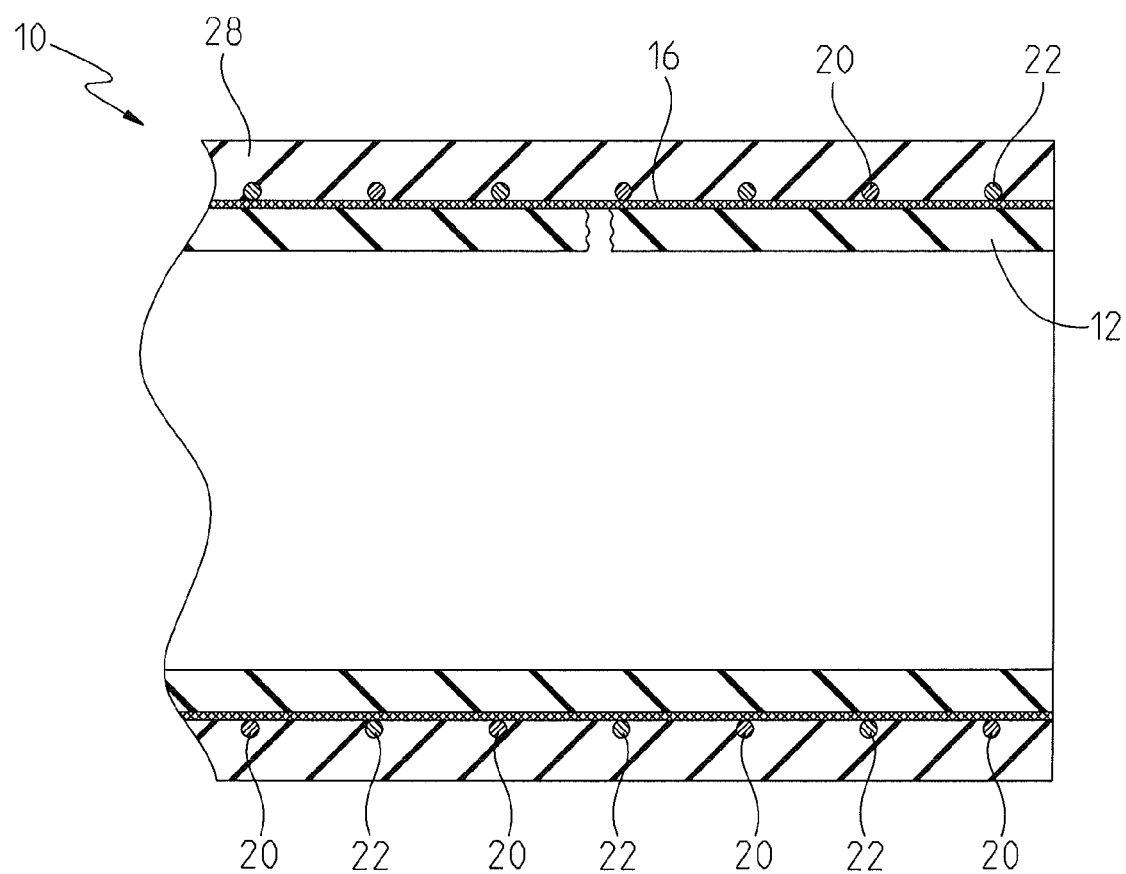
FIG. 5 is a the hose shown in FIG. 4 with the inner layer ruptured.
Figure 5A:
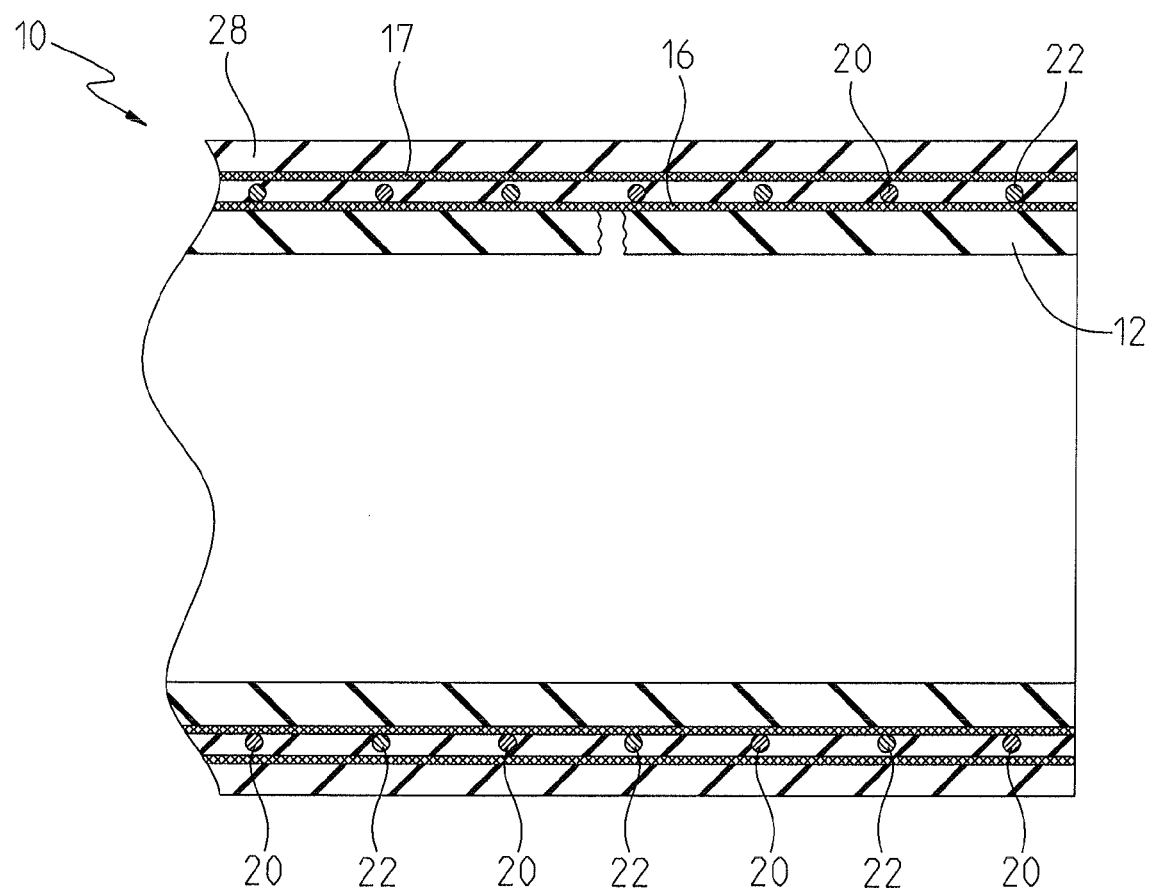
FIG. 5A is a sectional view of the hose similar to that shown in FIG. 5 having an additional layer of reinforcing filaments in the outer layer.

The transition layer 16 forms a flow path for fluid traveling within the hose 10 when the inner layer 12 is breached as shown in FIG. 5. When the inner layer 12 is breached, the fluid will wick along the filaments in the transition layer 16. Typically this hose 10 will be used to transport a fluid that conducts electricity, such as water. As the fluid wicks into the filaments of the transition layer 16, the fluid will contact both the first and second wires 20, 22. The fluid contact with both wires 20, 22 will complete a circuit between the first and second wires 20, 22. In some applications it may be desirable to include a second layer of filaments 17 within the outer layer 28. This layer of filaments 17 will provide additional strength in the outer layer 28 when the inner layer 12 is ruptured and is illustrated in FIG. 5A. The filaments 17 do not act as a transition layer and need not be in contact with the wires 20, 22.

Figure 6:
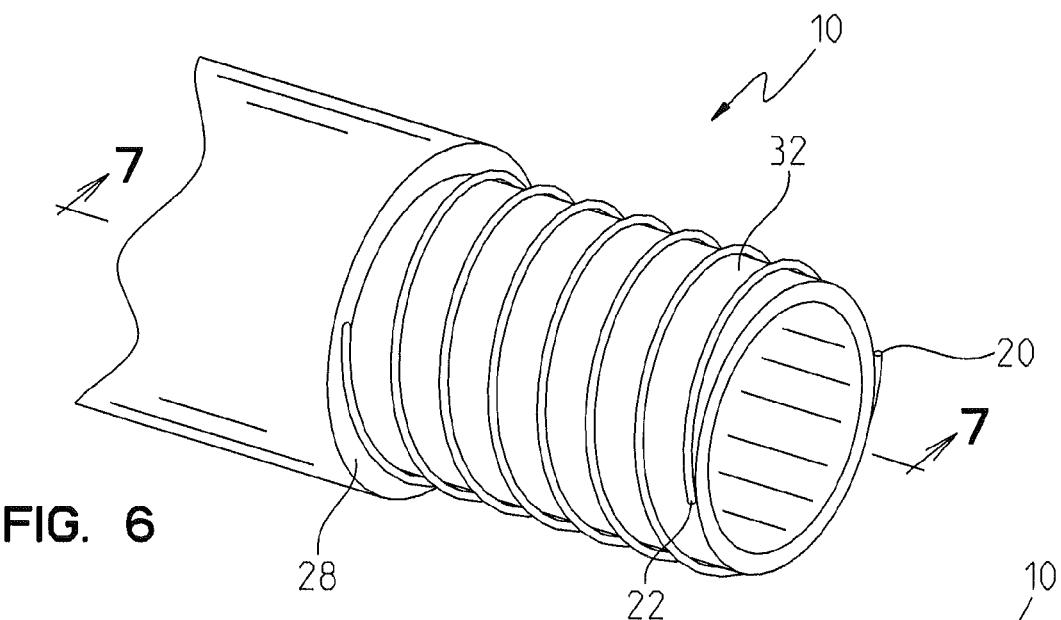
FIG. 6 is a cutaway perspective of a hose without reinforcement filaments.
Figure 7:
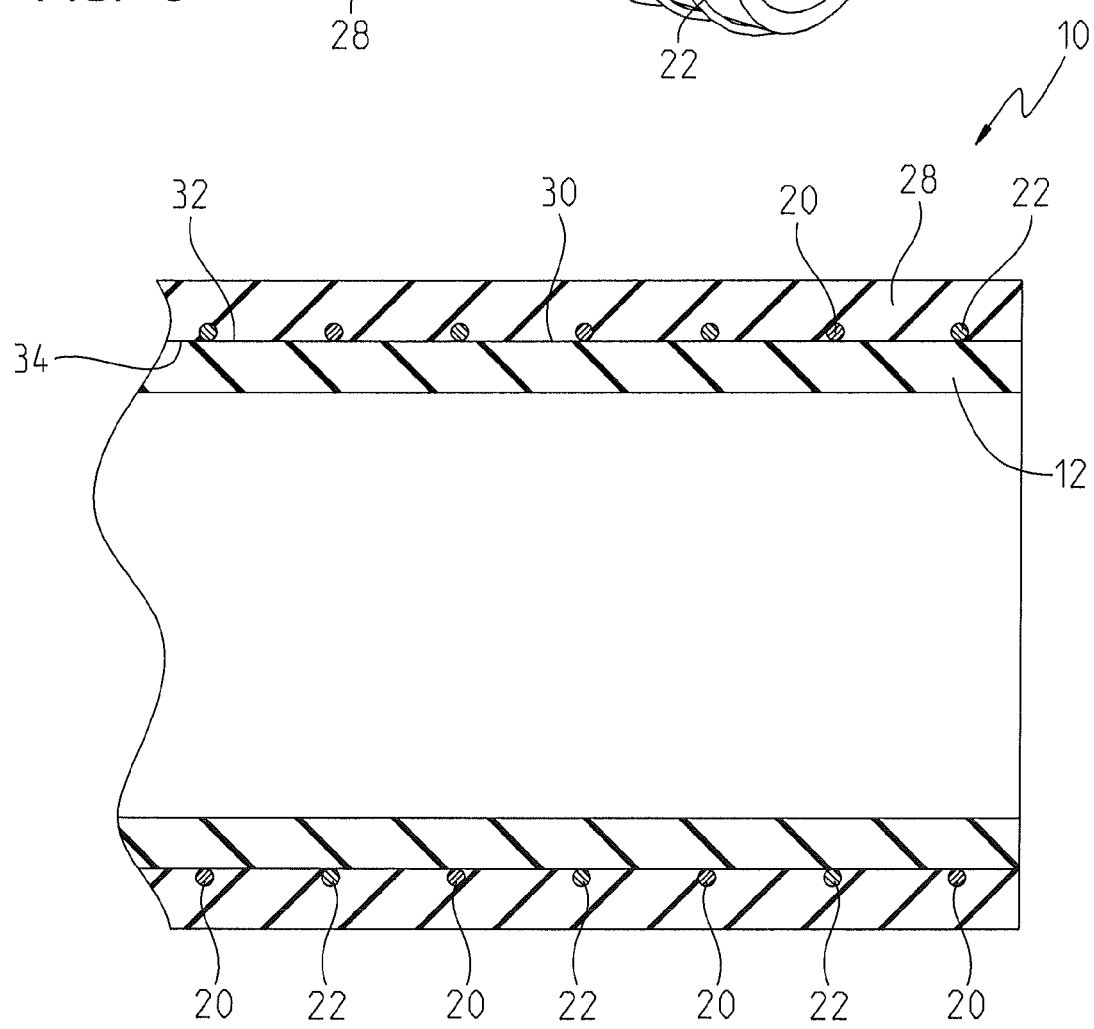
FIG. 7 is a sectional view of the hose shown in FIG. 6 taken about the line 7-7.
Figure 8:
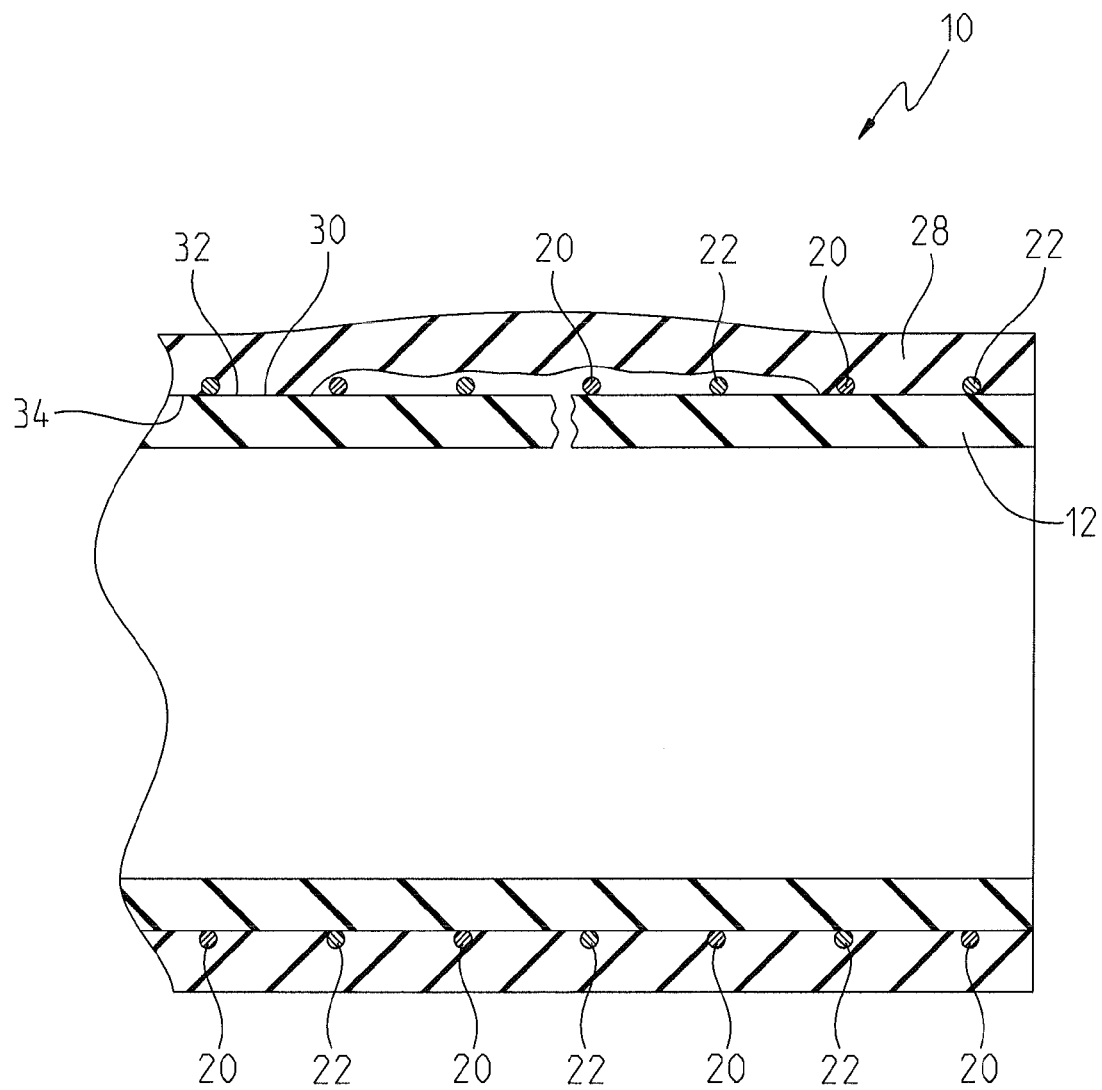
FIG. 8 is the hose shown in FIG. 7 with the inner layer ruptured.
Figure 8A:
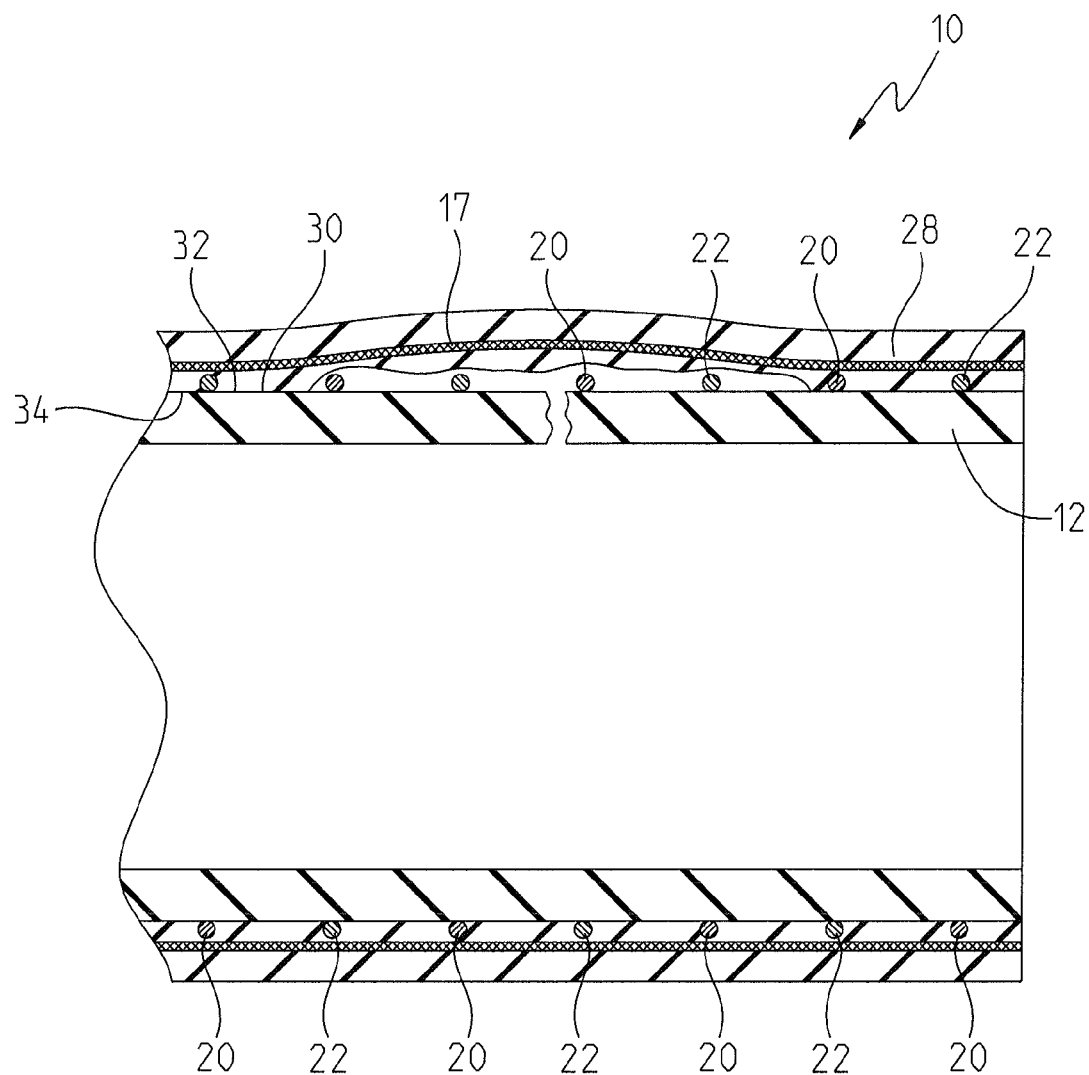
FIG. 8A is a sectional view of the hose similar to that shown in FIG. 8 having an additional layer of reinforcing filaments in the outer layer.

Another embodiment of the hose 10 is shown in FIGS. 6-8. In this embodiment, the transition layer 30 is the interface where the outer surface 32 of the inner layer 12 meets the inner surface 34 of the outer layer 28. This embodiment of the hose 10 is without filaments to provide wicking action to complete a circuit between the wires 20, 22. When the inner layer 12 of this embodiment is breached, the transition layer 30 acts as a flow path as shown in FIG. 8. During manufacture of this embodiment, the inner layer 12 is in place on a mandrel before the outer layer 28 is deposited upon the inner layer 12. This forms a distinct abrupt transition that allows fluid to flow along the transition layer 30 between the inner layer 12 and the outer layer 28, thus completing a circuit between the two wires 20, 22. Although there are no filaments to provide wicking in this embodiment, filaments 17 may be included to reinforce the outer layer 28 in a similar manner as described in the previous embodiment. This is illustrated in FIG. 8A. These filaments 17 need not be in contact with the wires 20, 22.

The wires 20, 22 of the above mentioned embodiments are connected to an external sensor that will indicate when a circuit is completed. This sensor may be connected to an alarm that warns of a breach in the inner layer 12 of the hose. The wires 20, 22 may also be connected to something as simple as a light that will illuminate when the circuit between the first and second wires 20, 22 is completed by the fluid. This will provide notice of a breach with some time to replace the hose 10 before the outer layer 28 ruptures and allows the fluid to be spilled into the surrounding environment. The helical winding of the wires 20, 22 provides many locations around the transition layer 16, 30 for a potential short circuit to occur. This will ensure that a breach in the inner layer 12 occurring on one side of the hose will be detected quickly because the fluid will only have to flow a short distance in the transition layer 16, 30 for the short circuit to be detected. The closer the spacing is between the wires 20, 22 the more quickly a leak may be detected, and this configuration provides for the detection of small pinhole leaks before fluid leaves the hose 10. The ability of the hose 10 to quickly detect leaks is particularly useful for toxic substances transported in aqueous solution that may be extremely hazardous if spilled and would cause expensive remediation measures if released into the environment.

The construction of the present invention will warn of a rupture in the inner layer 12 when a circuit is completed by the fluid contacting both wires 20, 22. When the circuit is open between the wires 20, 22, energy will not be consumed. Thus, the present invention is an energy efficient alternative to a system that depends upon an electrified circuit being broken to indicate that part of the hose 10 had ruptured.

The invention is not limited to the details given above but may be modified within the scope of the following claims.

What is claimed is:

1. A leak detecting hose for transporting fluid comprising:
an inner layer;
a filament being wound around said inner layer in one helical direction;
first and second electrically conductive wires being wound helically in the same direction and being spaced from each other so that no contact is made between said first and second conductive wires, the helical direction of said wires being opposite that of said filament such that said filament contacts both wires intermittently whereby a breach of said inner hose would cause fluid in said hose to wick along said filament and electrically connect said wires; and
an outer layer circumscribing said inner layer, said filament and said wires.

2. A leak detecting hose as claimed in claim 1, wherein said outer layer is in direct contact with said inner layer in spaces between said wires and said filament.

3. A leak detecting hose as claimed in claim 1, wherein said outer layer directly contacts said inner layer where said wires and said filament do not.

4. A leak detecting hose as claimed in claim 1, wherein said filament is wound so that it does not contact itself.

5. A leak detecting hose as claimed in claim 4, wherein said outer layer directly contacts said inner layer where said wires and filament do not.

\* \* \* \* \*